(12) United States Patent
Hornung

(10) Patent No.: US 11,596,094 B2
(45) Date of Patent: Mar. 7, 2023

(54) TINE SUPPORTED GAUGE WHEEL

(71) Applicant: Matthew Hornung, Dodge City, KS (US)

(72) Inventor: Matthew Hornung, Dodge City, KS (US)

( * ) Notice: Subject to any disclaimer, the term of this patent is extended or adjusted under 35 U.S.C. 154(b) by 0 days.

(21) Appl. No.: 16/533,811

(22) Filed: Aug. 7, 2019

(65) Prior Publication Data

US 2021/0037697 A1 Feb. 11, 2021

(51) Int. Cl.
  *A01C 5/06* (2006.01)
  *A01C 7/20* (2006.01)

(52) U.S. Cl.
  CPC .............. *A01C 5/064* (2013.01); *A01C 5/068* (2013.01); *A01C 7/203* (2013.01)

(58) Field of Classification Search
  CPC ......... B60B 15/08; B60B 15/18; A01C 5/064; A01C 5/068; A01C 7/20
  See application file for complete search history.

(56) References Cited

U.S. PATENT DOCUMENTS

| | | | |
|---|---|---|---|
| 4,986,200 A | 1/1991 | Johnston | |
| 5,970,891 A | 10/1999 | Schlagel | |
| 7,584,706 B1 | 9/2009 | Smith | |
| 7,730,962 B1 | 6/2010 | Kester | |
| 7,823,521 B1 | 11/2010 | Smith | |
| 8,069,798 B2 | 12/2011 | Martin | |
| 8,104,543 B2 | 1/2012 | Hesla | |
| 8,720,351 B1 * | 5/2014 | Wipf | A01C 7/203 111/137 |
| 9,113,587 B2 | 8/2015 | Hesla | |
| 9,204,591 B2 | 12/2015 | Hesla | |
| 9,481,204 B1 * | 11/2016 | Wiebe | A01G 25/095 |
| 9,769,971 B2 | 9/2017 | Hesla | |
| 10,136,572 B2 | 11/2018 | Weisz | |
| 2008/0066662 A1 | 3/2008 | Hesla | |
| 2016/0050837 A1 * | 2/2016 | Schaffert | A01B 29/04 172/540 |

* cited by examiner

*Primary Examiner* — Thomas B Will
*Assistant Examiner* — Ian A Normile
(74) *Attorney, Agent, or Firm* — Gregory M. MacDonald, Esq.

(57) ABSTRACT

The present invention relates generally to a device that allows a tire to adequately clean a soil cutting disc, maintains the critical seed planting depth, or prevents (1) punctures, (2) soil compaction, (3) premature wear, (4) tire readjustment, (5) operational problems, (6) rough surfaces that fill with mud and debris, and (7) tire removal to clean the gauge wheel or remove buildup. The present invention also provides a device with a gauge wheel for controlling the depth of a furrow created by a soil cutting disk that has one or more of these features. More specifically, the present invention comprises a gauge wheel assembly for farming with a centrally positioned hub, a plurality of spokes extending from the hub to at least one ground contacting finger that extend to an inner circular ring around the circumference.

17 Claims, 12 Drawing Sheets

TINE SUPPORTED GAUGE WHEEL

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention generally relates to agricultural machinery. More specifically, the present invention relates a novel gauge wheel for use with a conventional row planter or drill assembly to facilitate planting in adverse conditions.

2. Description of Related Art

Planting equipment has long been used for planting seeds such as row crops. Typically the planter includes one or more seed hoppers and opening disks for creating a V-shaped slot in the soil for seed placement. Gauge wheels on the planter determine the maximum planting depth, and closing wheels behind the opening disks are responsible for closing the V-shaped slot in the soil after the seeds have been placed therein. By placing the gauge wheel and tire along each side of the disc, this allows for seed placement and packing of the soil around the seed.

Conventional gauge wheels comprise smooth rubber tires or wheels, which pack and compact the soil adjacent to the slot formed in the soil by the opening disks. As part of this design, the tire engages and scrapes the outside surface of the disk to keep wet soil from building up on the disc. In this way, the engagement of the wheel on the disk keeps the inside of the gauge wheel clean and free of dirt and debris, while serving the gauging function of the desired seed depth.

The foregoing design concept is used on many crop planters, disk air drills, and box drills. Although this design is effective at depth control, it suffers from many problems. For example, when the soil contains too much moisture, the gauge and closing wheels compact the soil, which leaves a smooth surface that dries into a tough soil crust that inhibits or prohibits the growing seedlings from emerging through the surface of the soil.

Another problem with this design is related to the flexibility of the rubber or rubber-like tire that is kept tightly against the outside of the metal disk to scrape away wet soil. Due to the inherent flex in the tire, the tire may not adequately clean the disc. Also, this engagement causes premature wear on the tire requiring early replacement. Additionally, the flexibility of the tire may cause operational problems when scraping against the disc. Furthermore, the flexible rubber or rubber-like gauge wheel tires are prone to puncture from sharp objects such as rocks and standing residue from previously harvested crop stocks. Moreover, even if no punctures occur, the chipping or abrasion in the rubber or rubber-like material creates a rough surface of small pockets that are prone to fill with mud and debris material. This is especially prevalent after some operational wear occurs, when planting in particularly muddy conditions, or when encountering certain soil types. These conditions accelerate the buildup of mud and debris around the circumference of the gauge wheel, which compromises the very critical planting depth of the seed.

Additionally, certain field conditions and soil types tend to push mud and debris out in front of the gauge wheel, creating chunks of material in front of the row unit and between adjacent row units, which may stop or clog the entire planter or drill. Often removal and cleaning is required to remove buildup on either the inside or outside of the gauge wheel. In addition, the tire may need to be readjusted to compensate for wear or replaced altogether. These delays are costly and time consuming and incredibly frustrating especially when they occur during the narrow planting window.

Therefore, for the foregoing reasons, there is a need for a new gauge wheel design that allows a tire to adequately clean a soil cutting disc, maintains the critical seed planting depth, and prevents either (1) punctures, (2) soil compaction, (3) premature wear, (4) tire readjustment, (5) operational problems, (6) rough surfaces that fill with mud and debris, or (7) tire removal to clean the gauge wheel to remove buildup. The device described in this patent application fulfills at least one of these needs or creates other utility.

BRIEF SUMMARY OF THE INVENTION

It is a principal object to either solve at least one of the disadvantages with other attempted solutions or to create other utility by providing a device that allows a tire to adequately clean a soil cutting disc, maintains the critical seed planting depth, or prevent (1) punctures, (2) soil compaction, (3) premature wear, (4) tire readjustment, (5) operational problems, (6) rough surfaces that fill with mud and debris, or (7) tire removal to clean the gauge wheel or remove buildup. The present invention provides a device with a gauge wheel for controlling the depth of a furrow created by a soil cutting disk that has one or more of these features. More specifically, the present invention comprises a gauge wheel assembly for farming with a centrally positioned hub, a plurality of spokes extending from the hub to at least one ground contacting finger that extends to an inner circular ring around the circumference.

The ground contacting fingers are constructed at an appropriate size, spacing, and angle to optimize the gauging function, while allowing material, dirt, and debris to flow through the system without mud or blockage build up. These ground contacting fingers ("fingers") contact the soil at spaced locations and at such an angle as to release any mud or debris approximately vertically downward as the fingers exit the soil. Also, the angle and size of the fingers are constructed in such a way as to optimize the surface area contact with the ground. Additionally, the inner circular ring allows for close proximity to the opening disk for consistently scraping mud and debris off of the disc. Furthermore, the fingers allow the scraped material to easily flow through and out of the gauge wheel.

Accordingly, the present invention allows a tire to adequately clean a soil cutting disc, maintain the critical seed planting depth, and prevents (1) punctures, (2) soil compaction, (3) premature wear, (4) tire readjustment, (5) operational problems, (6) rough surfaces that fill with mud and debris, and (7) tire removal to clean the gauge wheel or remove buildup.

BRIEF DESCRIPTION OF THE DRAWINGS

The accompanying drawings, which are incorporated in and constitute a part of this specification, illustrate several aspects described below.

DETAILED DESCRIPTION OF THE INVENTION

Figure 1:
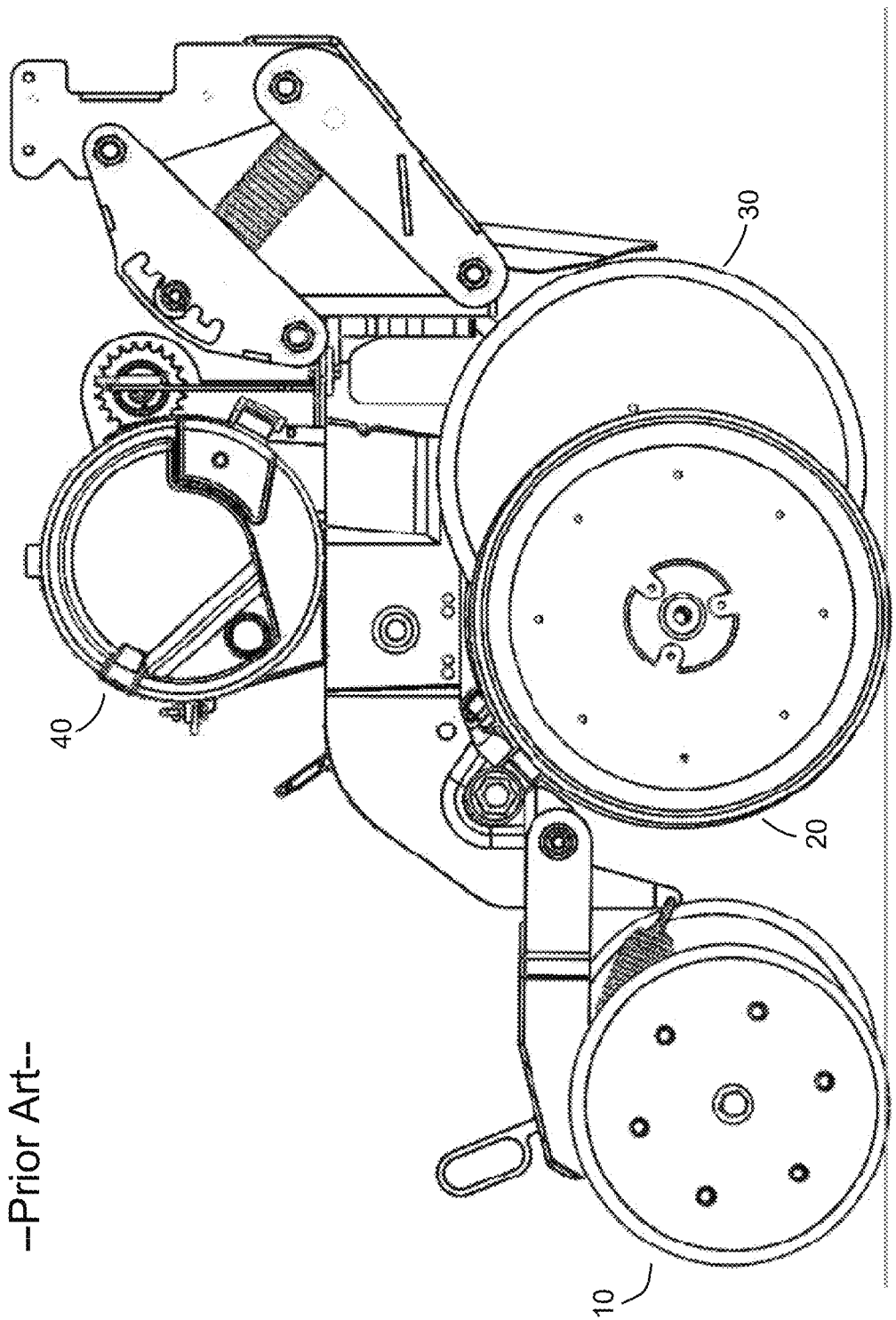
FIG. 1 is a side view of the prior art showing a soil covering assembly, a soil cutting disc, and a 4.5-inch wide by 16-inch in diameter gauge wheel making contact along an even ground plane.

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details. Thus, all illustrations of the drawings are for the purpose of describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

All illustrations are for the purpose of describing selected versions of the present invention and are not intended to limit the scope of the present invention.

Figure 2:
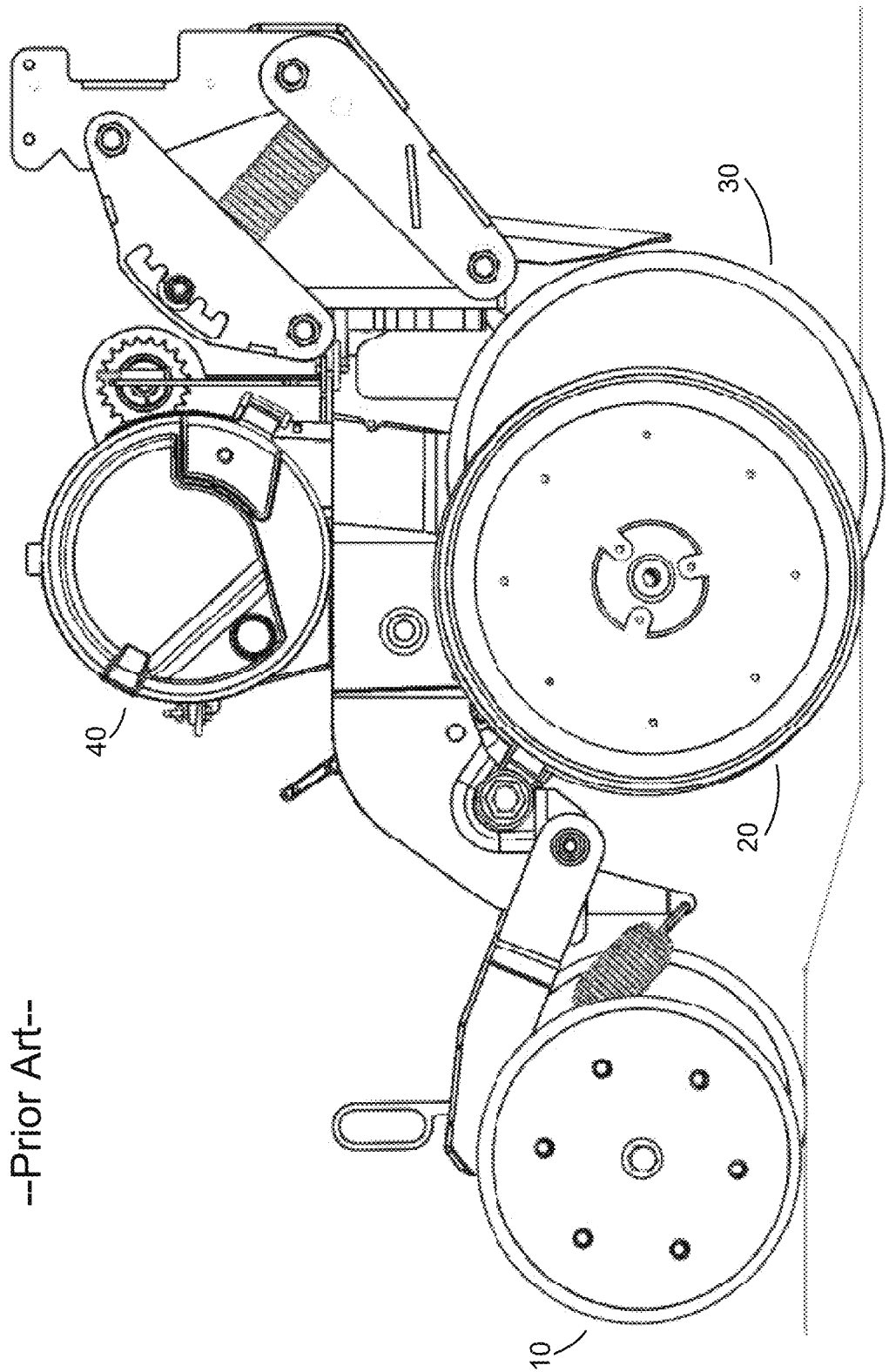
FIG. 2 is another side view of the prior art, except that the left end is on a higher plane than the right end, which also shows a soil covering assembly, a soil cutting disc, and a 4.5-inch wide by 16-inch in diameter gauge wheel making contact along an uneven ground plane.
Figure 3:
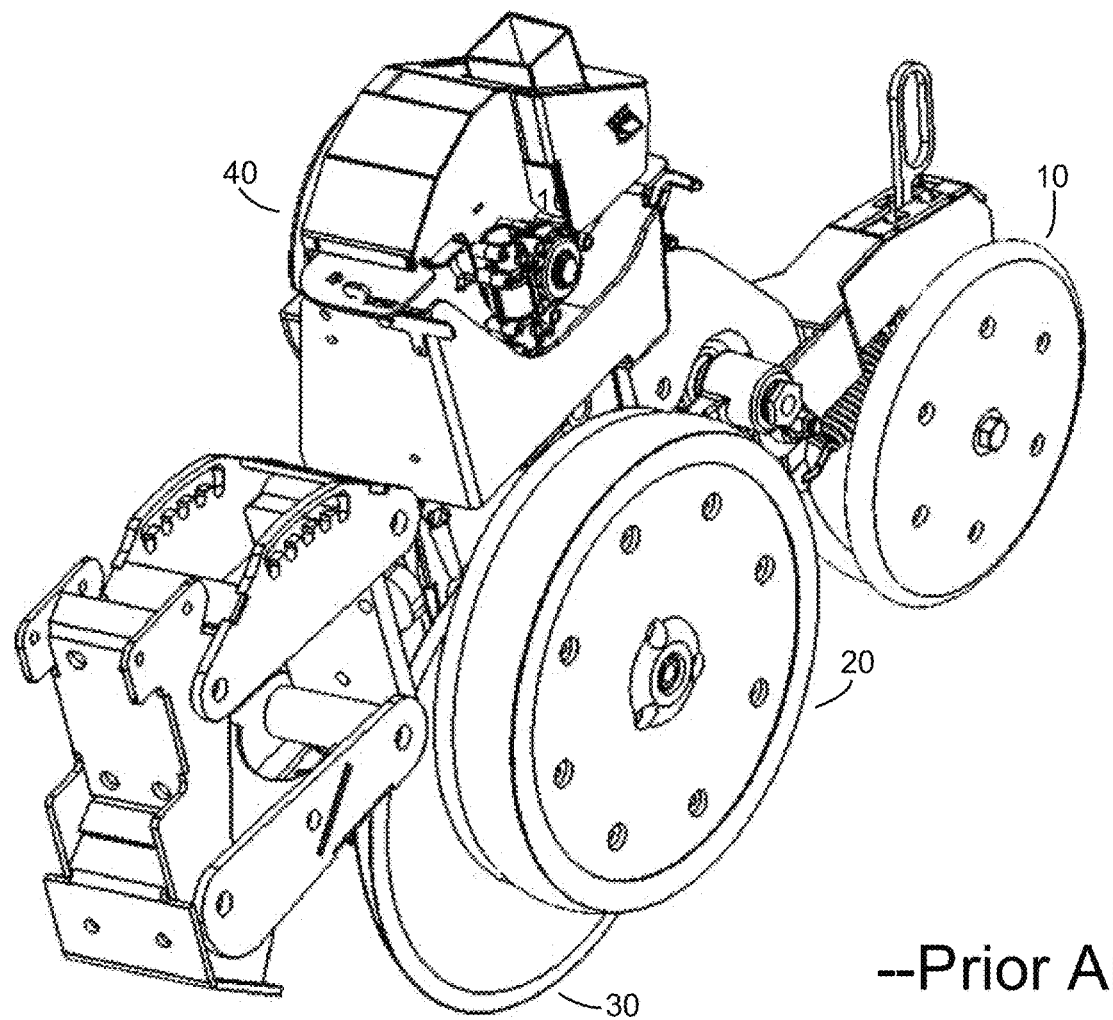
FIG. 3 is an isometric view of the prior art showing a seed metering device, a soil covering assembly, a soil cutting disc, and a 4.5-inch wide by 16-inch in diameter gauge wheel.
Figure 4:
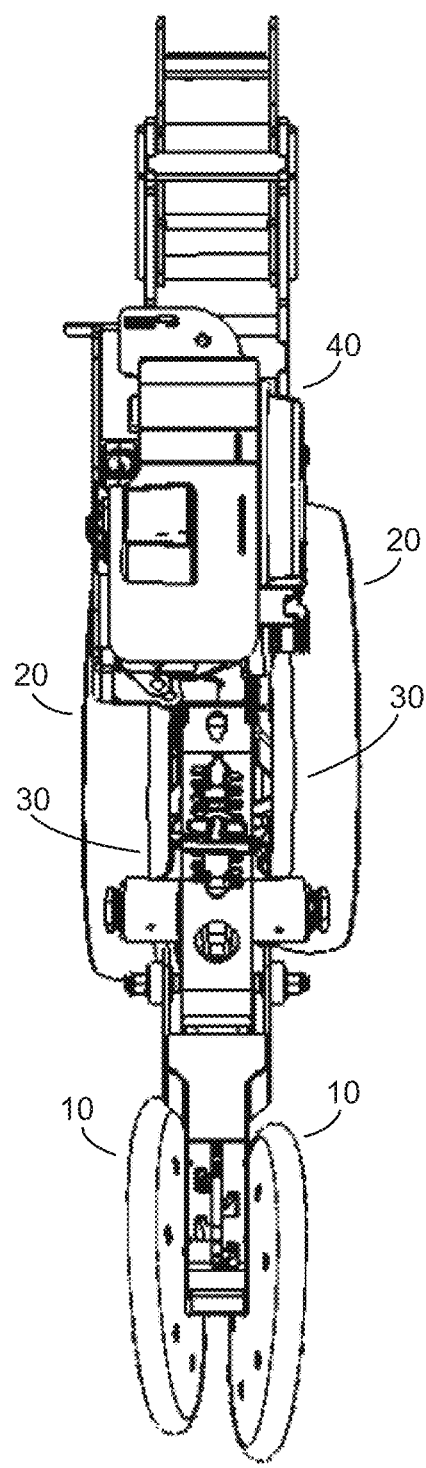
FIG. 4 is a top view of the prior art showing a seed metering device, a soil covering assembly, a soil cutting disc, and a 4.5-inch wide by 16-inch in diameter gauge wheel.

FIG. 1 is a side view of the prior art being operated on a flat plane. FIG. 1 shows a soil covering assembly 10, a 4.5-inch wide by 16-inch in diameter gauge 20 wheel, a soil cutting disk 30, and a seed metering device 40. FIG. 2 is a similar side view of the prior art, except that the left end is on a higher plane than the right end. FIG. 3 shows an isometric view of the prior art showing a soil covering assembly 10, a 4.5-inch wide by 16-inch in diameter gauge 20 wheel, a soil cutting disk 30, and a seed metering device 40. FIG. 4 is a top view of the prior art showing a soil covering assembly 10, a 4.5-inch wide by 16-inch in diameter gauge 20 wheel, a soil cutting disk 30, and a seed metering device 40.

Figure 5:
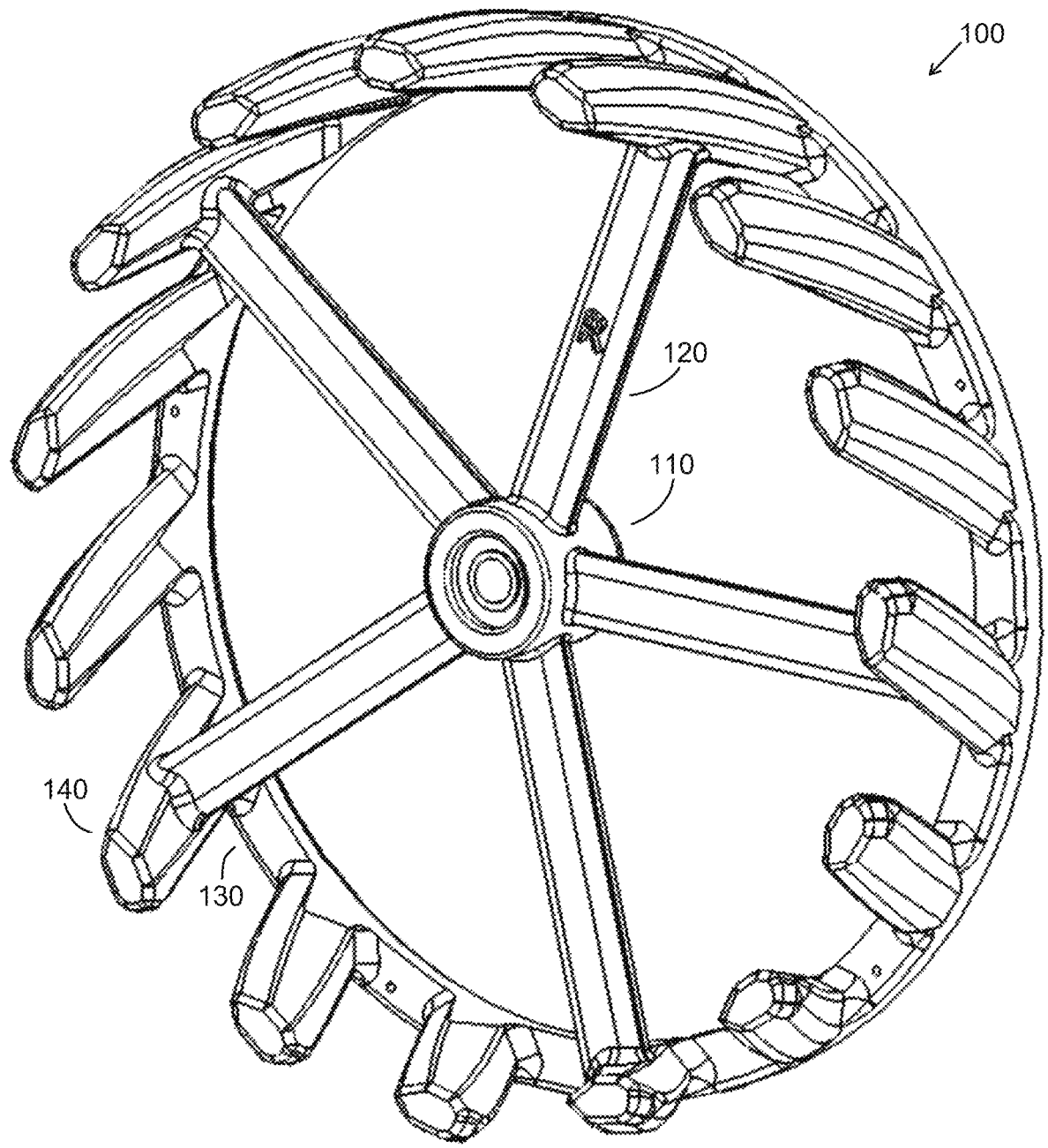
FIG. 5 is a perspective outside view of part of the device of the present invention illustrating a right planter gauging wheel with circumferential inward blade contacting ring attached to a peripheral circular array of outwardly metal ground contacting fingers in which at least one of the embodiments of this invention is implemented.

FIG. 5 is a perspective side view of the device of the present invention illustrating a right outside view of the planter gauging wheel 100 with circumferential inward blade contacting ring 130 attached to a peripheral circular array of outwardly metal ground contacting fingers 140 in which at least one of the embodiments of this invention is implemented. The planter gauging wheel 100 is about 4.5-inch wide and about 16-inches in diameter. It has about 15 metal ground contacting fingers 140, which connect to a circumferential inward blade contacting ring 130. About every third ground contacting finger connects to a spoke. There are about five spokes 120 that attached to a hub 110 in the center of the gauging wheel. Thus, the hub 110 connects to about five spokes 120, where each of the spokes 120 connect to a ground contacting finger 140. Each of the ground contacting fingers 140 connect to the circumferential inward blade contacting ring 130. In between the spokes 120 there are about two additional ground contacting fingers 140. Therefore, there are about five ground contacting fingers 140, where at least one is attached to each spoke. In addition, there are about two ground contacting fingers 140 between each of the five spokes 120. As a result, there are a total of about 15 ground contacting fingers 140.

Figure 6:
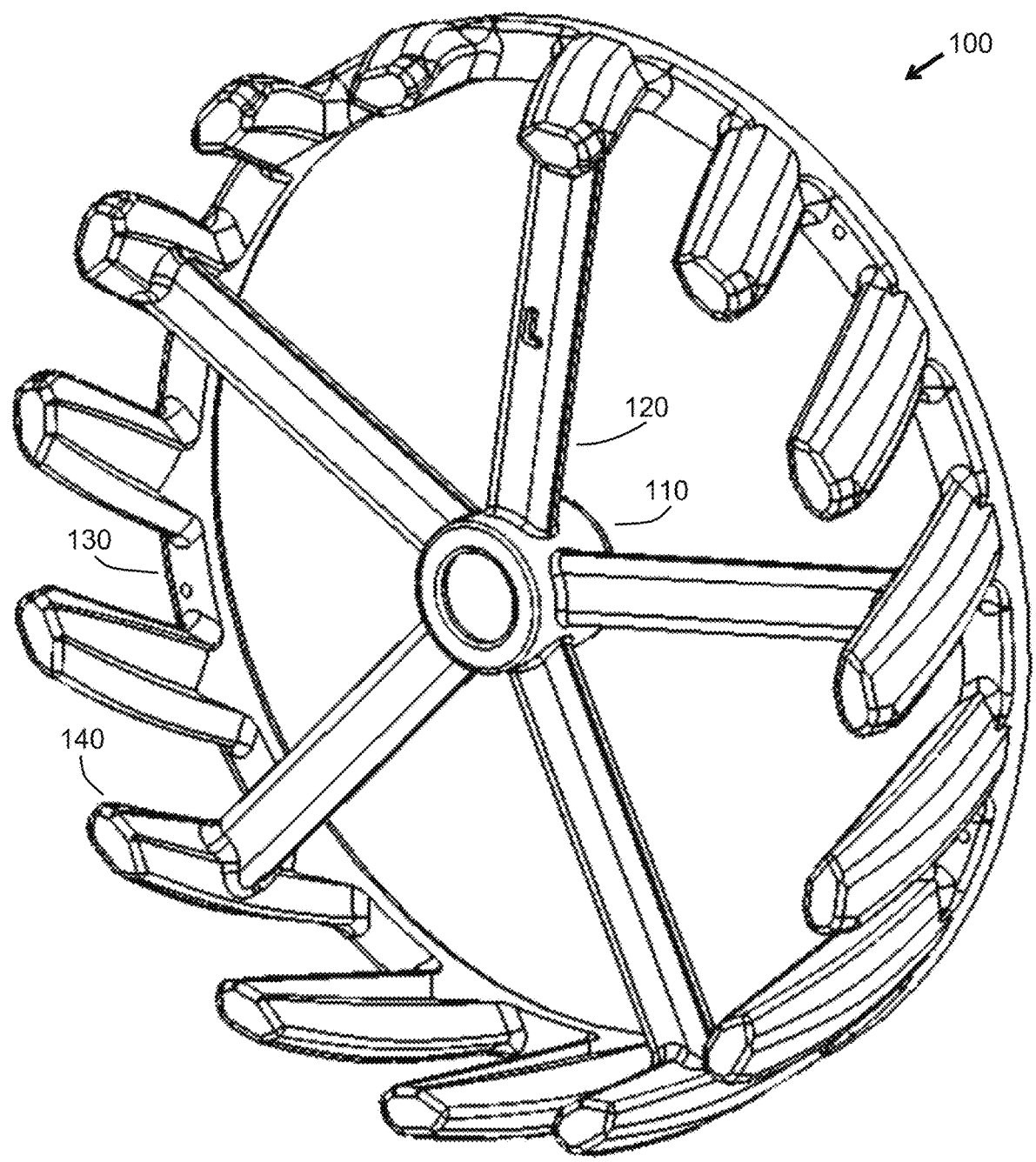
FIG. 6 is a perspective outside view of part of the device of the present invention illustrating a left planter gauging wheel with circumferential inward blade contacting ring attached to a peripheral circular array of outwardly metal ground contacting fingers in which at least one of the embodiments of this invention is implemented.

FIG. 6 is a perspective side view of the device of the present invention illustrating a left outside view of the planter gauging wheel 100 comprising (a) a centrally positioned hub 110, (b) an outer circumference contacting ring 130, and (c) a plurality of ground contacting fingers 140, and (d) a plurality of spokes 120, where the spokes 120 having a proximal end and a distal end. The ground contacting fingers 140 also have a proximal end, a distal end, and a center region. The proximal end of the ground contacting fingers 140 connect to the outer circumference contacting ring 130 at equivalent intervals from both adjacent ground contacting fingers 140.

As further shown in FIG. 6, the proximal end of the spokes 120 may connect to the centrally positioned hub 110. The distal end of the spoke may connect to the outer circumference contacting ring 130. Also, the proximal end of the spokes 120 connect to the centrally positioned hub 110, and the distal end of the spoke connects to the center region of at least one ground contacting finger 140. At least one ground contacting finger 140 that does not have its center region connected to the distal end of one of the spokes 120 is placed between ground contacting fingers 140 that do have their center region connected to the distal end of one of the spokes 120.

In at least one embodiment, each ground contacting finger 140 has its center region connected to the distal end of one of the spokes 120. In at least one other embodiment, at least one ground contacting finger 140 does not have its center region connected to the distal end of one of the spokes 120. In at least yet one embodiment, the centrally positioned hub 110 is about ½-inch to 4-inches tall with an outer diameter of about 1-inch to 4-inches, and an inner diameter of about ¼-inch to 2-inches. The spokes 120 are about 4-inches to 10-inches long, ½-inch to 2-inches wide, and ¼-inch to 1-inch thick. The ground contacting fingers 140 are about 1.5-inches to 6-inches long, ¼-inch to 2-inches wide, and ¼-inch to 1-inch thick. The centrally positioned hub 110, the spokes 120, and the ground contacting fingers 140 are comprised of a material selected from the group consisting of plastic, metal, glass, and wood. In at least yet one other embodiment the flex of the planter gauging wheel 100 has a displacement of 0.05-inch or less.

In at least one embodiment, the proximal end of the ground contacting fingers 140 connects perpendicularly to the outer circumference contacting ring 130. In at least one other embodiment, the proximal end of the ground contacting fingers 140 may connect at an angle of about 10 to about 80 degrees to the outer circumference contacting ring 130. In at least one embodiment, there may be at least 5 spokes 120 attached between the centrally positioned hub 110 and the outer circumference contacting ring 130, and at least 15 ground contacting fingers 140 attached to the outer circumference contacting ring 130.

Figure 7:
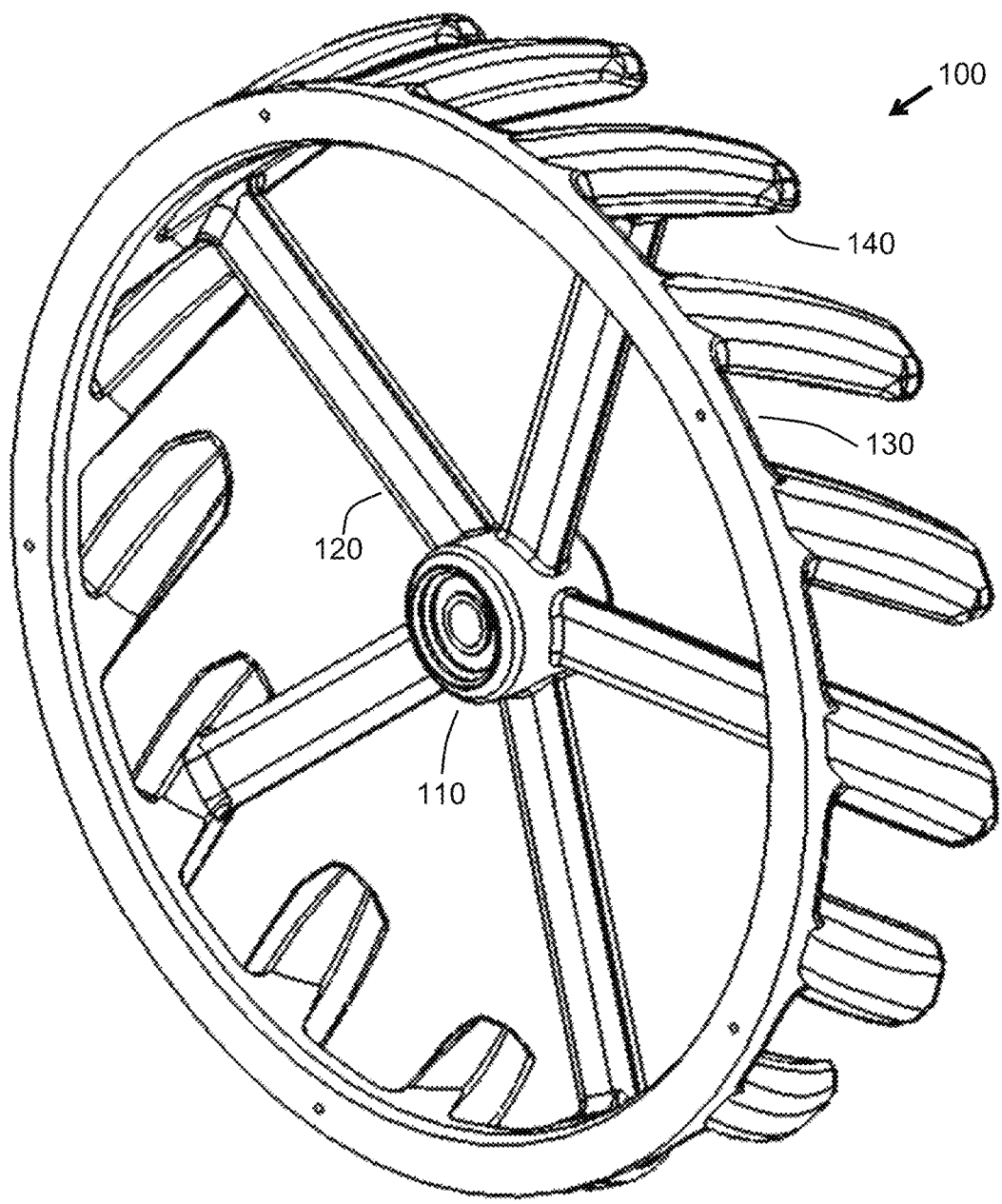
FIG. 7 is a perspective inside view of part of the device of the present invention illustrating a planter gauging wheel with circumferential inward blade contacting ring attached to a peripheral circular array of outwardly metal ground contacting fingers in which at least one of the embodiments of this invention is implemented.

While FIG. 6 shows an outside view of the planter gauging wheel 100 with circumferential inward blade contacting ring 130 attached to a peripheral circular array of outwardly metal ground contacting fingers 140. FIG. 7 shows an inside view of the planter gauging wheel 100 with circumferential inward blade contacting ring 130 attached to a peripheral circular array of outwardly metal ground contacting fingers 140.

In at least one embodiment of the present invention, as shown in FIG. 5 through FIG. 7, the planter gauging wheel 100 connects to the device as shown in FIG. 8 through FIG. 12. The planter gauging wheel 100 replaces the 4.5-inch wide by 16-inch in diameter gauge 20 wheel on the device. The ground contacting fingers 140 that connect to the circumferential inward blade contacting ring 130 contact the ground without compressing the ground.

Figure 8:
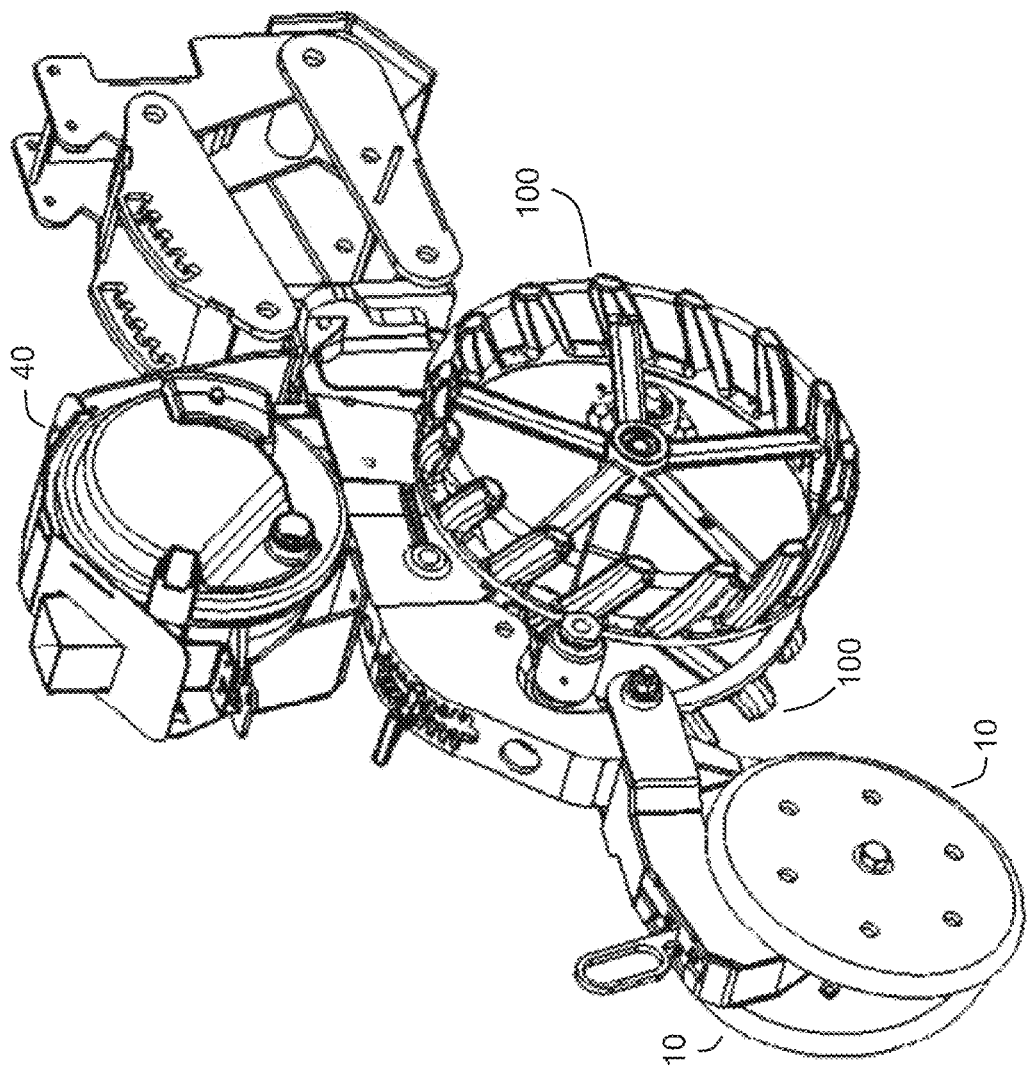
FIG. 8 is an isometric side view of the device showing the seed metering device, soil covering assembly, soil cutting disc, and the planter gauging wheel with circumferential inward blade in which at least one of the embodiments of the present invention is shown.

FIG. 8 is an isometric side view of the device showing the soil covering assemblies 10, the seed metering device 40, and the planter gauging wheels 100 with circumferential inward blade, where the soil cutting disk 30 is mostly hidden.

Figure 9:
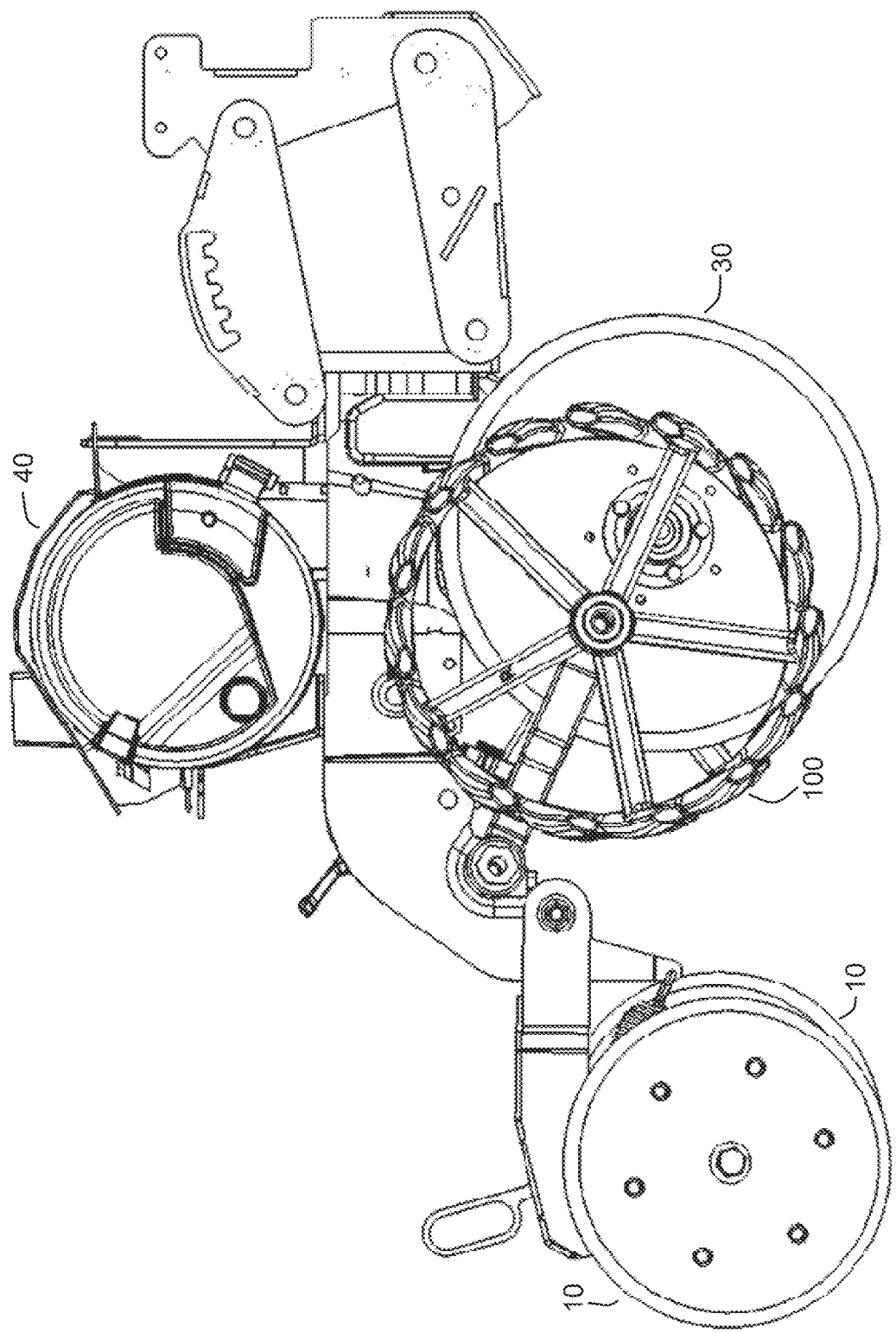
FIG. 9 is a side view of the device showing the seed metering device, soil covering assembly, soil cutting disc, and the planter gauging wheel with circumferential inward blade in which at least one of the embodiments of the present invention is shown.

FIG. 9 is a side view of the device showing the seed metering device 40, soil covering assembly 10, two disks of the soil cutting disk 30, and the right planter gauging wheel 100, where the planter gauging wheel 100 is mostly hidden. In FIG. 9, the device is configured so that the planter gauging wheel 100 does not contact the soil cutting disk 30. FIG. 9 also shows that the device is for planting seeds and comprises (a) at least one planter gauging wheel 100, (b) at least one seed metering device 40, (c) at least one soil covering assembly 10, and (d) at least one soil cutting disk 30.

Figure 10:
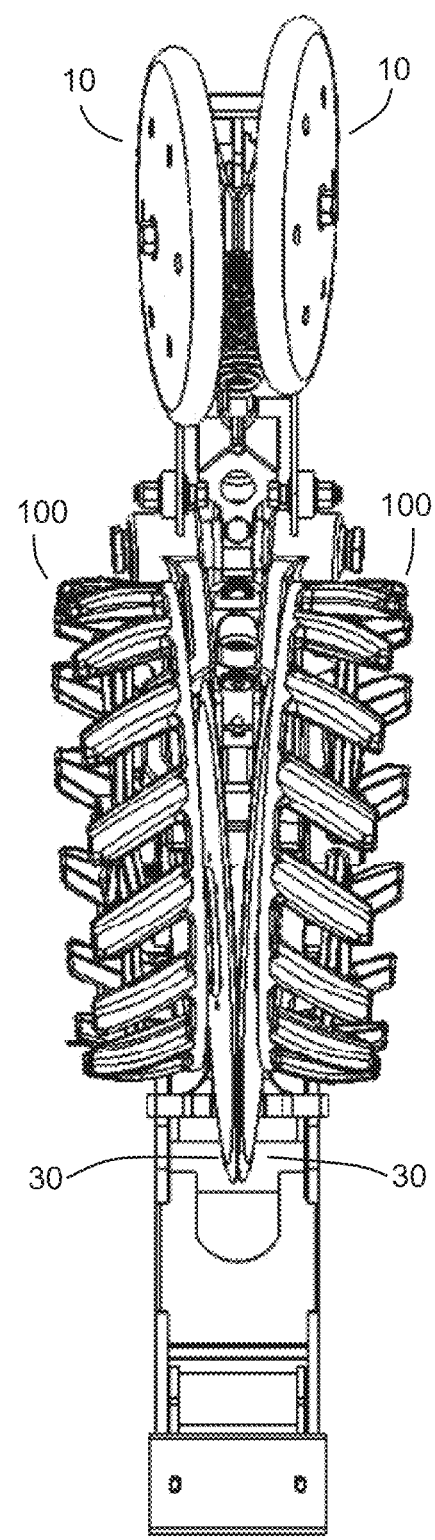
FIG. 10 is a close-up of the bottom view of the device showing the seed metering device, soil covering assembly, soil cutting disc, and the planter gauging wheel with circumferential inward blade in which at least one of the embodiments of the present invention is shown.

FIG. 10 is a bottom view of the device showing the disks of the soil covering assembly 10, the soil cutting disks 30, and the planter gauging wheels 100.

Figure 11:
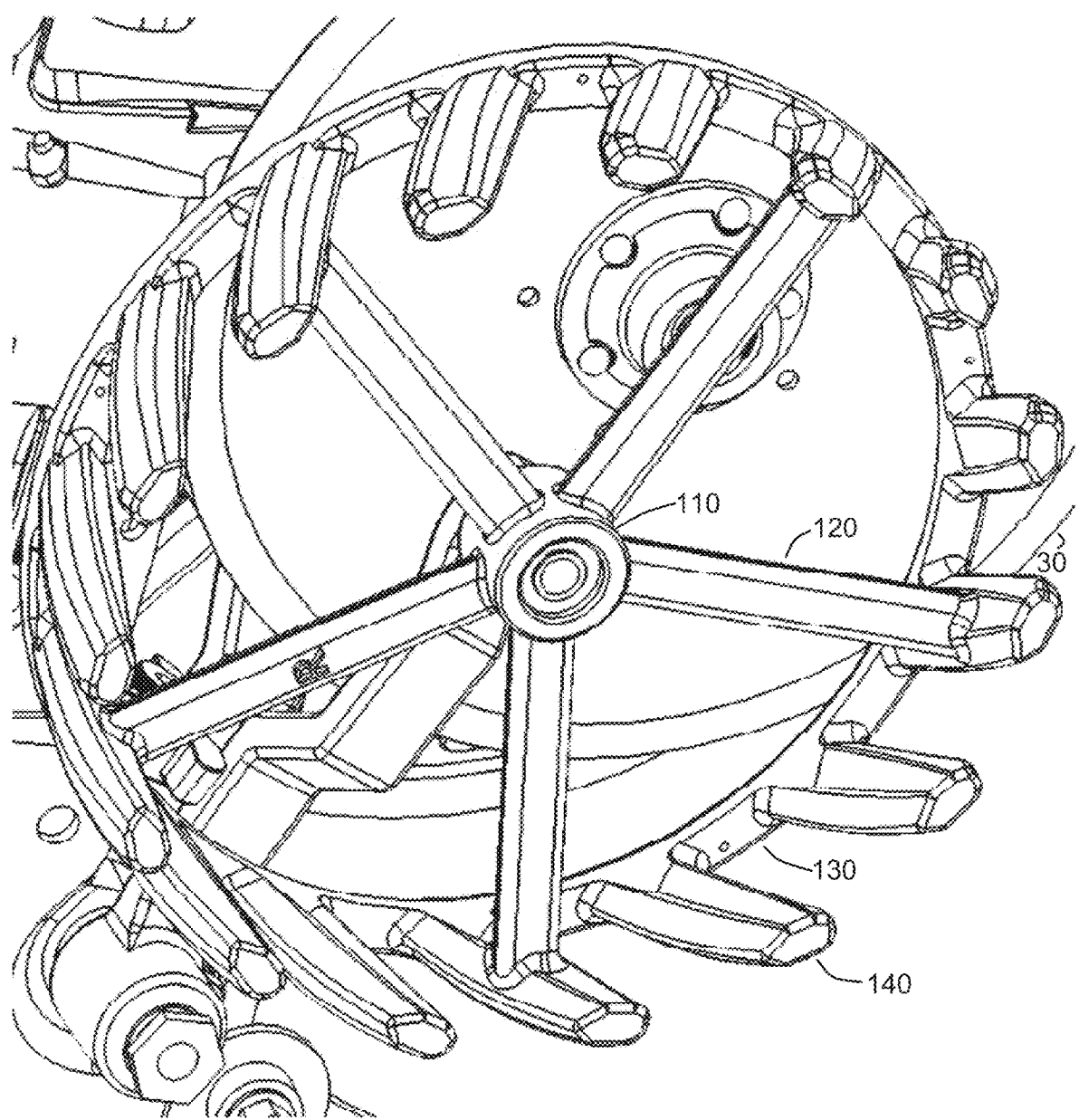
FIG. 11 is a close-up view of the planter gauging wheel with circumferential inward blade in which at least one of the embodiments of the present invention is shown.
Figure 12:
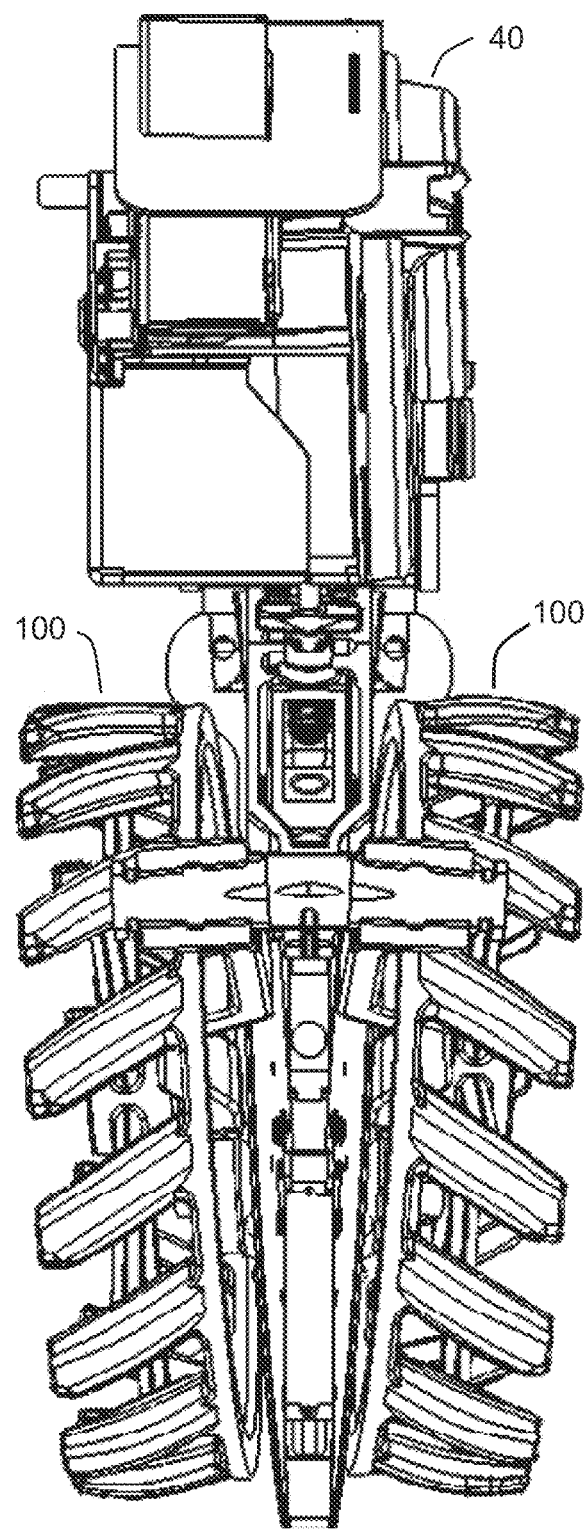
FIG. 12 is a close-up back section view of the planter gauging wheel with circumferential inward blade showing left and right fingers angled properly to alleviate soil and debris buildup in which at least one of the embodiments of the present invention is shown.

FIG. 11 is a close-up view of the planter gauging wheel 100 with circumferential inward blade. FIG. 12 is a close-up front view of the planter gauging wheels 100 with circumferential inward blades.

Although the invention has been explained in relation to several different embodiments, it is to be understood that many other possible modifications and variations can be made without departing from the spirit and scope of the invention.

All of these embodiments and the invention disclosed herein are intended to be within the scope herein disclosed. These and other embodiments of the invention will become readily apparent to those skilled in the art from the detailed description of the embodiments having reference to the attached figures, the embodiments not being limited to any particular embodiments disclosed. Also, the invention disclosed herein suitably may be practiced in the absence of any element which is not specifically disclosed herein.

What is claimed is:

1. A device for planting seeds, the device comprising:
   a. at least one planter gauging wheel, comprising:
      i. a centrally positioned hub;
      ii. an outer circumference contacting ring;
      iii. a plurality of ground contacting fingers; the ground contacting fingers having a proximal end, a distal end, and a center region, wherein the proximal end of the ground contacting fingers connects to one side of the outer circumference contacting ring at equivalent intervals from both adjacent ground contacting fingers so that the other side of the outer circumference contacting ring may be within close proximity to a soil cutting disk for consistently scraping mud or debris off of the disk;
      iv. a plurality of spokes, the spokes having a proximal end and a distal end;
   b. at least one seed metering device;
   c. at least one soil covering assembly;
   d. at least one soil cutting disc;
   e. wherein the proximal end of the spokes connects to the centrally positioned hub, and the distal end of the spokes directly connects to the center region of at least one ground contacting finger, wherein the spokes are in radial alignment with the center region of the ground contacting fingers that they connect to;
   f. wherein the centrally positioned hub is in the same plane as the center region of the ground contacting fingers that they connect to;
   g. wherein the ground contacting fingers that do not have their center region directly connected to a spoke are positioned between the ground contacting fingers that do have their center region directly connected to a spoke;
   h. and wherein the ground contacting fingers that do not have their center region directly connected to a spoke are connected to the ground contacting fingers that do have their center region directly connected to a spoke only via their mutual connection to the outer circumference contacting ring.

2. The device of claim 1, wherein at least one ground contacting finger does not have its center region connected to the distal end of one of the spokes.

3. The device of claim 1, wherein at least one ground contacting finger that does not have its center region connected to the distal end of one of the spokes is placed between ground contacting fingers that do have their center region connected to the distal end of one of the spokes.

4. The device of claim 1, wherein the centrally positioned hub is about ½-inch to 4-inches tall with an outer diameter of about 1-inch to 4-inches and an inner diameter of about ¼-inch to 2-inches.

5. The device of claim 1, wherein the centrally positioned hub is comprised of a material selected from the group consisting of plastic, metal, glass, and wood.

6. The device of claim 1, wherein the plurality of spokes are about 4-inches to 10-inches long, ½-inch to 2-inches wide, and ¼-inch to 1-inch thick.

7. The device of claim 1, wherein the spokes are comprised of a material selected from the group consisting of plastic, metal, glass, and wood.

8. The device of claim 1, wherein the plurality of ground contacting fingers are about 1.5-inches to 6-inches long, ¼-inch to 2-inches wide, and ¼-inch to 1-inch thick.

9. The device of claim 1, wherein the ground contacting fingers are comprised of a material selected from the group consisting of plastic, metal, glass, and wood.

10. The device of claim 1, wherein the proximal end of the ground contacting fingers connect perpendicularly to the outer circumference contacting ring.

11. The device of claim 1, wherein the proximal end of the ground contacting fingers connect at an angle of about 10 degrees to 80 degrees to the outer circumference contacting ring.

12. The device of claim 1, wherein the proximal end of the ground contacting fingers connect at an angle of about 45 degrees to the outer circumference contacting ring.

13. The device of claim 1, wherein there are at least 5 spokes attached between the centrally positioned hub and the outer circumference contacting ring.

14. The device of claim 1, wherein there are at least 8 ground contacting fingers attached to the outer circumference contacting ring.

15. The device of claim 1, wherein the planter gauging wheel does not contact the soil cutting disc.

16. The device of claim 1, wherein the flex of the planter gauging wheel has a displacement of 0.05-inch or less.

17. The device of claim 1, wherein the ground contacting fingers are of substantially adequate size and shape as to approximately equal the ground contacting surface area of a traditional solid 4.5"×16" planter gauge wheel when the planter gauging wheel is about 4.5-inches wide and about 16-inches in diameter with about 15 metal ground contacting fingers that connect to a circumferential inward blade contacting ring where the ground contacting fingers are about 1.5-inches to 6-inches long, ¼-inch to 2-inches wide, and ¼-inch to 1-inch thick.

* * * * *